United States Patent
Boussant-Roux et al.

(10) Patent No.: US 6,509,287 B2
(45) Date of Patent: Jan. 21, 2003

(54) FUSED CAST AZS PRODUCTS OF REDUCED COST

(75) Inventors: Yves Marcel Leon Boussant-Roux, Avignon (FR); Michel Marc Gaubil, Avignon (FR); Thierry Bruno Jacques Colozzi, Avignon (FR)

(73) Assignee: Societe Europeenne des Produits Refractaires, Courbevoie (FR)

( * ) Notice: Subject to any disclaimer, the term of this patent is extended or adjusted under 35 U.S.C. 154(b) by 0 days.

(21) Appl. No.: 09/883,327

(22) Filed: Jun. 19, 2001

(65) Prior Publication Data

US 2002/0013212 A1 Jan. 31, 2002

(30) Foreign Application Priority Data

Jun. 20, 2000 (FR) .............................................. 00 07831

(51) Int. Cl.⁷ .............................................. C04B 35/48
(52) U.S. Cl. ....................................................... 501/105
(58) Field of Search ................................. 501/103, 104, 501/105

(56) References Cited

U.S. PATENT DOCUMENTS 3,754,950 A * 8/1973 Cevales
4,119,472 A * 10/1978 Brashear, Jr. et al.
4,910,174 A * 3/1990 Bert et al. .................. 501/105

FOREIGN PATENT DOCUMENTS

FR            2.142.624           2/1973

* cited by examiner

*Primary Examiner*—Paul Marcantoni
(74) *Attorney, Agent, or Firm*—Young & Thompson

(57) ABSTRACT

Fused cast AZS products that contain:

$Al_2O_3$: 45–65 wt. %, $ZrO_2$: 10.0–29.0 wt. %, $SiO_2$: 20.0–24.0 wt. %, $SiO_2/(Na_2O+K_2O)$ weight ratio: 4.5–8, and other species: 0.5–4.0 wt. %

These products may be produced from manufacturing waste or recycled spent materials.

9 Claims, No Drawings

FUSED CAST AZS PRODUCTS OF REDUCED COST

FIELD OF THE INVENTION

The invention relates in particular to AZS (alumina-zirconia-silica) products which are less expensive than the conventional AZS products currently available and whose properties are adapted to non-extreme service conditions such as those prevailing in the rear areas of glass-melting furnaces and/or in some furnace superstructures. The products of the invention contain more silica and less zirconia than the conventional AZS products currently used.

BACKGROUND OF THE INVENTION

Products which are fused and cast in a mould (also called fused cast products) can be obtained by melting a mixture of appropriate raw materials in an electric arc furnace or any other melting technique suitable for these products. The molten liquid is then cast in a mould to obtain shaped parts directly. In general, the product is then subjected to a controlled cooling cycle in order to bring it to ambient temperature without breakage. This operation is called annealing by those skilled in the art.

AZS products have been known for several decades. U.S. Pat. No. 2,438,552 describes one of the first improvements made to this type of product. It advocates the addition of $Na_2O$ (1–2.2%) and MgO/CaO (0.2–0.8%) to solve feasibility problems concerning products containing 45–70% $Al_2O_3$, 14–40% $ZrO_2$ and 9–12% $SiO_2$.

The AZS products currently on sale, such as the Applicant's ER-1681, ER-1685 or ER-1711, contain from 45 to 50% $Al_2O_3$, from 32 to 40% $ZrO_2$, from 12 to 16% $SiO_2$ and approximately 1% $Na_2O$.

These products are entirely suitable for the production of glass-melting furnaces. The present AZS materials are principally used for the zones in contact with the molten glass as well as for the superstructure of the glass-melting furnaces. However, the superstructures of some laboratory furnaces are less demanding from the point of view of corrosion resistance.

In addition, the rear areas of the furnace, such as the burner flues or the tops, walls and stacking parts of heat regenerator chambers are areas which, not being in contact with the molten glass, are less demanding from the point of view of corrosion resistance. The present AZS products are little used in these areas because of their excessively high cost.

On the other hand, materials in these areas of the furnace are subject to intense variations in temperature caused by the operating cycles of the regenerators. In fact, during operation of the stacking chambers of the regenerator, hot gases from the furnace enter the stack at the top and release their heat energy. During this time, cold air enters at the bottom of another stack heated during the preceding cycle and is hot when it exits the top of the stack, from where it is conducted to the burners.

There thus exists a need for a cheap refractory material whose properties are suited to operating conditions less demanding than those which prevail in the rear areas of glass-melting furnaces and/or in some superstructures of less efficient furnaces.

With the aim of proposing a less expensive product, we have envisaged reducing the cost of the raw materials. This may be achieved firstly by reducing the proportion of zirconia, which is an expensive component of the composition, and secondly by using secondary materials (manufacturing waste or recycled spent materials).

However, this attractive solution entails a number of problems concerning feasibility and behaviour of the materials in service, associated with the change in the chemical analysis of the materials and the possible presence of high levels of impurities which may, for example, arise from the use of spent products.

We have found, surprisingly, a field of chemical analysis for ensuring the feasibility of the parts as well as good behaviour of the material in service in the abovementioned areas of the glass-melting furnaces.

SUMMARY OF THE INVENTION

The invention more particularly provides fused and cast AZS products characterized in that they contain:

$Al_2O_3$: 45–65 wt. %

$ZrO_2$: 10.0–29.0 wt. %

$SiO_2$: 20.0–24.0 wt. %

$SiO_2/(Na_2O+K_2O)$ (weight ratio):4.5–8.0 other species: 0.5–4.0 wt. %

The $SiO_2/(Na_2O+K_2O)$ weight ratio is preferably in the range from 6.0 to 7.0.

The $ZrO_2$ proportion is preferably in the range from 14.0 wt. % to 25.0 wt. %.

The $Al_2O_3$ proportion is preferably in the range from 50 wt. % to 65 wt. %.

AZS products according to the invention that are particularly preferred contain:

$Al_2O_3$: 50–65 wt. %

$ZrO_2$: 14.0–25.0 wt. %

$SiO_2$: > 20.0–24.0 wt. %

$SiO_2/(Na_2O+K_2O)$ (weight ratio):6.0–7.0 other species: 0.5–4 wt. %

The AZS products according to the invention can be moulded into any desired shape. Preferred shapes are stackable cruciform components and blocks. The blocks preferably have a $ZrO_2$ proportion which is in the range from 20 wt. % to 25 wt. %. Such blocks are particularly useful in the superstructures or the rear areas of glass-melting furnaces.

The cruciform components preferably have a $ZrO_2$ proportion which is in the range from 14 wt. % to 20 wt. %. Such components are particularly useful in glass-melting furnace regenerators.

DETAILED DESCRIPTION

The aim of reducing cost is achieved by decreasing the zirconia proportion, compared with current products. However, the zirconia proportion must not be too low, otherwise the product loses its cohesion when in use. The reason for this is that zirconia is highly refractory and offers very good chemical resistance at high temperature. In practice, the products of the invention contain from 10 wt. % to 29 wt. % zirconia and preferably 14 wt. % to 25 wt. %.

The other species, in particular the impurities, which may be present in relatively large proportions (up to 4 wt. %) are in the glass phase consisting mainly of silica. To avoid an excessively high concentration of them in the glass phase, which would degrade the performance qualities of the product, it has been found that the proportion of silica should be at least 20 wt. % and preferably greater than 20 wt. %.

Moreover, the silica proportion is limited by the application. Specifically, products containing more than 24 wt. % silica show poor tolerance to repeated heat cycles and/or very degraded properties on application.

The presence of sodium oxide and/or potassium oxide in AZS products is common and necessary to give the glass phase suitable physical and chemical properties. However, to make manufacture of the parts feasible and to achieve good behaviour in the intended application, it has been found that the weight ratio of the silica to the combination of the sodium oxide and potassium oxide should be within a particular critical range, i.e. between 4.5 and 8. For cost reasons, sodium oxide is preferably used.

Moreover, the other species, which are inevitable impurities or deliberate additions, will be present in a total proportion from 0.5 wt. % to 4 wt. %. These other species comprise calcium oxide and magnesium oxide in particular. Contrary to the teachings of Patent FR 1 328 880, fluorine does not need to be present and the products of the invention do not contain any.

Alumina constitutes the remainder to 100% of the total of the abovementioned constituents.

In accordance with the invention, the reduction in the zirconia proportion is compensated by increasing the silica proportion, and more particularly the alumina proportion.

According to one embodiment which is particularly advantageous in economic terms, the AZS products of the invention are produced from raw materials comprising a secondary material, such as manufacturing waste or a recycled spent AZS material. It is preferred to use a recycled spent AZS material. The secondary material may constitute from 20% to 85% of the weight of the charge to be melted, preferably 40% to 70%.

Needless to say, the products of the invention may also be produced solely from conventional raw materials.

The invention also relates to the use of the AZS products in accordance with the invention to manufacture rear areas of glass-melting furnaces such as the burner flues or tops, or the walls of heat-regenerating chambers, and stackable components for heat regenerators, such as components of cruciform or other shape.

The following description, which is given with reference to examples, clearly defines the field of chemical analysis in accordance with the invention and demonstrates the advantages of the novel products obtained.

In these examples, the raw material used was product A, a secondary material which corresponds to AZS products containing about 32 wt. % zirconia, 51 wt. % alumina and 15 wt. % silica. These products (manufacturing waste or spent products) are crushed to a particle size of less than 20 mm to give the product A used in the embodiments of the invention. The other raw materials used were products with a purity greater than 98%; in particular, alumina, zirconia sand, silica smoke, sodium carbonate and zirconia (for example CC10 zirconia sold by the Applicant). Other species were inevitably present as impurities, in particular calcium oxide and magnesium oxide.

The products were obtained by melting the raw material charge in an Heroult electric melting furnace, under oxidative conditions as disclosed in French Patent No. 1 205 577, followed by casting in a mould and controlled cooling (annealing), according to the usual practice.

In the tables, the total for the percentages of the constituents mentioned does not reach 100%. The remainder to 100% consists of various impurities.

Table 1 collates a number of characteristics of the products made and the yields. In these products, the alkali metal oxide was $Na_2O$.

Attention was first focused on the practicality of making products according to the invention. For this, the yield was observed, which indicates the number of good articles relative to the total number of articles cast. An article is considered good if it shows no "through-fissures". Such defects may lead to complete fragmentation of the article. A person skilled in the art considers that, for products of this type, the yield is acceptable if it is greater than 70%. The articles produced were 300×250×300 mm blocks (type "B" in Table 1) or stackable regenerator components of cruciform type sold by the Applicant (type "C" in Table 1).

Our studies, and in particular the examples collated in Table 2, showed that it is the silica/sodium oxide ratio which is critical with regard to the practicality of making the product.

TABLE 2

| No. | Type | A, % in the charge | Chemical analysis (wt. %) | | | | | $SiO_2/Na_2O$ | Yield % |
| | | | $Al_2O_3$ | $ZrO_2$ | $SiO_2$ | $Na_2O$ | CaO + MgO | | |
|---|---|---|---|---|---|---|---|---|---|
| 38* | B | 100 | 49.2 | 24.5 | 18.3 | 5.3 | 2.2 | 3.5 | 20 |
| 39* | C | 90 | 43.6 | 24.7 | 23.7 | 5.6 | 1.6 | 4.2 | 60 |
| 37* | C | 90 | 48.5 | 23.6 | 20.4 | 4.6 | 2.3 | 4.4 | 40 |
| 27 | C | 0 | 55.2 | 19.8 | 20.2 | 4.1 | 0.3 | 4.9 | 85 |
| 33 | B | 0 | 53.4 | 20.4 | 20.9 | 4.2 | 0.3 | 5.0 | 95 |
| 24 | B | 60 | 53.0 | 19.2 | 21.2 | 3.9 | 1.6 | 5.4 | 100 |
| 32 | C | 80 | 48.5 | 20.3 | 23.7 | 4.2 | 2.0 | 5.6 | 85 |
| 15 | B | 53 | 58.0 | 15.8 | 20.9 | 3.6 | 1.0 | 5.8 | 70 |
| 35 | B | 60 | 51.0 | 21.7 | 22.1 | 3.7 | 1.0 | 6.0 | 100 |

The examples show that the yield is correct when the weight ratio of silica to sodium oxide is greater than 4.5. The analyses performed on the products obtained appear to indicate that below this limit the glass phase crystallizes in the form of nepheline. This crystalline phase appears at the expense of the glass phase. However, it is this glass phase which, by virtue of its plasticity, makes it possible to accommodate stresses associated with cooling of the material under thermal gradient and thus to ensure that it is feasible to make the product. The appearance of this crystallized phase makes it impossible to obtain an acceptable manufacturing yield.

Moreover, Examples 42* to 44* indicate that above 29 wt. % zirconia, manufacture of the products is no longer feasible, even with an $SiO_2/Na_2O$ weight ratio of between 4.5 and 8.

The high-temperature behaviour of the articles was also studied. The test (Test A) was carried out at temperatures of the order of those encountered in glass-melting furnaces. The products were maintained at 1500° C. for 48 hours and, after cooling, any visible degradation of the material, symptomatic of an internal transformation, was observed. Behaviour is considered "good" if no degradation (in particular cracking, deformation, etc.) is visible. Otherwise, behaviour is considered "poor" and the product is not suitable for the intended use. The results are collated in Table 3.

When the silica proportion increases, microfissures may appear, but the behaviour of the parts remains acceptable.

On the other hand, the results in Table 4 show that when the silica proportion is greater than 24 wt. %, the parts are poor, showing either great fragility on cycling or mechanical stress behaviour that is insufficient for use in a glass-melting furnace.

TABLE 3

| | | Chemical analysis (wt. %) | | | | | | |
|---|---|---|---|---|---|---|---|---|
| No. | Type | $Al_2O_3$ | $ZrO_2$ | $SiO_2$ | $Na_2O$ | CaO + MgO | $SiO_2/Na_2O$ | Yield % | Test A |
| 15 | B | 58.0 | 15.8 | 20.9 | 3.6 | 1.0 | 5.8 | 70 | good |
| 8 | C | 58.1 | 14.2 | 23.4 | 3.7 | 0.2 | 6.3 | 100 | good |
| 28 | C | 51.1 | 19.8 | 23.8 | 3.7 | 0.8 | 6.4 | 75 | good |
| 14 | C | 57.2 | 15.2 | 23.3 | 3.6 | 0.2 | 6.5 | 100 | good |
| 29 | C | 52.1 | 19.8 | 23.8 | 3.6 | 0.3 | 6.6 | 85 | good |
| 9 | C | 56.6 | 14.2 | 23.5 | 3.5 | 1.4 | 6.7 | 100 | good |
| 30 | B | 51.9 | 20.3 | 22.5 | 3.3 | 1.6 | 6.8 | 70 | good |
| 36 | C | 50.5 | 22.5 | 21.9 | 3.1 | 1.5 | 7.1 | 95 | good |
| 25 | C | 52.0 | 19.4 | 23.9 | 3.3 | 0.7 | 7.2 | 100 | good |
| 13 | B | 61.1 | 14.9 | 20.5 | 2.8 | 0.3 | 7.3 | 100 | good |
| 12 | C | 57.4 | 14.3 | 23.2 | 3.0 | 1.4 | 7.7 | 100 | good |
| 31* | B | 51.6 | 20.3 | 23.6 | 2.9 | 0.3 | 8.1 | 100 | poor |
| 41* | C | 50.6 | 28.6 | 17.3 | 2.1 | 0.9 | 8.2 | 90 | poor |
| 19* | C | 56.1 | 16.3 | 23.4 | 2.7 | 0.9 | 8.7 | 100 | poor |

It is found that when the $SiO_2/Na_2O$ weight ratio rises above 7, some fragility appears but the products remain usable; on the other hand, if the $SiO_2/Na_2O$ weight ratio is greater than 8, behaviour is poor. In fact, beyond this limit, mullite is formed, at the expense of the glass phase. However, the plasticity of this glass phase is necessary for the material not to be made brittle by the large temperature variations and the accompanying changes. When heated to high temperature and/or in an alkaline atmosphere, the mullite phase is transformed, which destroys the material.

The resistance to heat cycles was also studied (Test B). The reason for this is that the articles used in heat regenerators must undergo many heat cycles. For the test, the articles were subjected to 50 20-minute cycles between 1 350 and 900° C. The result is considered "good" if no large cracks are observed in the material after the test.

In fact, the silica is the component with the lowest melting point in the composition; its proportion needs to be limited to 24 wt. % to maintain the refractory nature of the products in accordance with the invention.

It is found that the products in accordance with the invention show satisfactory tolerance to heat cycles. It may be that this is promoted by the increase in the proportion of corundum in the parts obtained.

The vapour-phase corrosion strength was also tested. Specifically, even though the products in accordance with the invention are not intended to be used directly in contact with molten glass, there is a corrosive atmosphere in glass-melting furnaces due to the volatilization of components forming part of the composition of the glass being produced. This corrosive atmosphere transforms the products at high temperature, penetration by the corrosive components

TABLE 4

| | | Chemical analysis (wt. %) | | | | | | |
|---|---|---|---|---|---|---|---|---|
| No. | Type | $Al_2O_3$ | $ZrO_2$ | $SiO_2$ | $Na_2O$ | CaO + MgO | $SiO_2/Na_2O$ | Yield % | Test B |
| 5 | C | 60.9 | 13.6 | 21.1 | 3.3 | 0.5 | 6.4 | 100 | good |
| 10 | C | 59.5 | 14.3 | 21.4 | 3.3 | 1.0 | 6.5 | 100 | good |
| 7 | C | 57.6 | 13.9 | 21.9 | 3.5 | 1.3 | 6.3 | 100 | good |
| 36 | C | 50.5 | 22.5 | 21.9 | 3.1 | 1.5 | 7.1 | 95 | good |
| 11 | C | 57.3 | 14.3 | 22.8 | 3.8 | 1.3 | 6.0 | 100 | good |
| 12 | C | 57.4 | 14.3 | 23.2 | 3.0 | 1.4 | 7.7 | 100 | good |
| 14 | C | 57.2 | 15.2 | 23.3 | 3.6 | 0.2 | 6.5 | 100 | good |
| 18 | C | 55.8 | 16.2 | 23.3 | 3.4 | 1.1 | 6.9 | 100 | good |
| 8 | C | 58.1 | 14.2 | 23.4 | 3.7 | 0.2 | 6.3 | 100 | good |
| 17 | C | 55.4 | 16.1 | 23.4 | 3.9 | 1.1 | 6.0 | 100 | good |
| 9 | C | 56.6 | 14.2 | 23.5 | 3.5 | 1.4 | 6.7 | 100 | good |
| 28 | C | 51.1 | 19.8 | 23.8 | 3.7 | 0.8 | 6.4 | 75 | good |
| 29 | C | 52.1 | 19.8 | 23.8 | 3.6 | 0.3 | 6.6 | 85 | good |
| 25 | C | 52.0 | 19.4 | 23.9 | 3.3 | 0.7 | 7.2 | 100 | good |
| 34* | B | 49.8 | 21.4 | 24.6 | 3.7 | 0.2 | 6.6 | 100 | poor |
| 26* | C | 48.8 | 19.4 | 25.2 | 3.5 | 1.6 | 7.2 | 100 | poor |
| 22* | C | 51.9 | 18.4 | 25.7 | 3.4 | 0.2 | 7.6 | 100 | poor | resulting in a change in the material and a weakening which may lead to disintegration in service. The test was carried out at 1 300° C. for 150 hours in a sodic atmosphere. To compare the products, the thickness of the transformed area was measured.

Examples 3, 6, 10, 17, 26, 27 and 31 showed transformed thicknesses of 2 mm whereas, in the same test, the current product ER-1682 (50.6% $Al_2O_3$, 32.5% $ZrO_2$, 15.6% $SiO_2$, 1.1% $Na_2O$, and 0.2% others) from the Applicant undergoes a transformation over 1.5 mm. These results confirm the possibility of using the products in accordance with the invention in the rear areas and/or in the superstructure of glass-melting furnaces.

$Al_2O_3$: 50–65 wt. %,
$ZrO_2$: 14–25 wt. %, and
$SiO_2/(Na_2O+K_2O)$ weight ratio: 6–7.

3. The fused cast AZS product according to claim 1, having an $SiO_2/(Na_2O+K_2O)$ weight ratio from 6.0 to 7.0.

4. The fused cast AZS product according to claim 1, containing from 14.0 wt. % to 25.0 wt. % $ZrO_2$.

5. The fused cast AZS product according to claim 1, containing from 50 wt. % to 65 wt. % $Al_2O_3$.

6. The fused cast AZS product according to claim 1, produced from a starting charge containing 20 wt. % to 85 wt. % of secondary materials selected from the group consisting of manufacturing waste and recycled spent AZS material.

TABLE 1

| No. | Type | A | Chemical analysis (wt. %) | | | | | | Yield % |
|---|---|---|---|---|---|---|---|---|---|
| | | | $Al_2O_3$ | $ZrO_2$ | $SiO_2$ | $Na_2O$ | CaO + MgO | $SiO_2/Na_2O$ | |
| 1 | B | 30 | 62.5 | 10.4 | 22.2 | 3.4 | 1.0 | 6.5 | 90 |
| 2 | B | 0 | 62.7 | 11.9 | 21.5 | 3.2 | 0.2 | 6.7 | 100 |
| 3 | C | 45 | 62.3 | 12.7 | 20.3 | 2.8 | 1.3 | 7.3 | 100 |
| 4 | C | 52 | 60.3 | 13.5 | 21.0 | 3.2 | 1.3 | 6.6 | 100 |
| 5 | C | 20 | 60.9 | 13.6 | 21.1 | 3.3 | 0.5 | 6.4 | 100 |
| 6 | C | 44 | 60.5 | 13.7 | 21.2 | 3.0 | 1.0 | 7.1 | 100 |
| 7 | C | 52 | 57.6 | 13.9 | 21.9 | 3.5 | 1.3 | 6.3 | 100 |
| 8 | C | 0 | 58.1 | 14.2 | 23.4 | 3.7 | 0.2 | 6.3 | 100 |
| 9 | C | 54 | 56.6 | 14.2 | 23.5 | 3.5 | 1.4 | 6.7 | 100 |
| 10 | C | 44 | 59.5 | 14.3 | 21.4 | 3.3 | 1.0 | 6.5 | 100 |
| 11 | C | 51 | 57.3 | 14.3 | 22.8 | 3.8 | 1.3 | 6.0 | 100 |
| 12 | C | 50 | 57.4 | 14.3 | 23.2 | 3.0 | 1.4 | 7.7 | 100 |
| 13 | B | 0 | 61.1 | 14.9 | 20.5 | 2.8 | 0.2 | 7.3 | 100 |
| 14 | C | 0 | 57.2 | 15.2 | 23.3 | 3.6 | 0.2 | 6.5 | 100 |
| 15 | B | 53 | 58.0 | 15.8 | 20.9 | 3.6 | 1.0 | 5.8 | 70 |
| 16 | C | 61 | 55.8 | 15.8 | 23.5 | 3.5 | 1.2 | 6.7 | 100 |
| 17 | C | 55 | 55.4 | 16.1 | 23.4 | 3.9 | 1.1 | 6.0 | 100 |
| 18 | C | 55 | 55.8 | 16.2 | 23.3 | 3.4 | 1.1 | 6.9 | 100 |
| 19* | C | 50 | 56.1 | 16.3 | 23.4 | 2.7 | 0.9 | 8.7 | 100 |
| 20 | C | 51 | 54.7 | 17.0 | 23.6 | 3.6 | 0.9 | 6.6 | 100 |
| 21 | C | 54 | 54.5 | 17.2 | 23.4 | 3.4 | 1.0 | 6.9 | 85 |
| 22* | C | 0 | 51.9 | 18.4 | 25.7 | 3.4 | 0.2 | 7.6 | 100 |
| 23 | B | 0 | 56.3 | 18.6 | 21.4 | 3.0 | 0.2 | 7.1 | 100 |
| 24 | B | 60 | 53.0 | 19.2 | 21.2 | 3.9 | 1.6 | 5.4 | 100 |
| 25 | C | 51 | 52.0 | 19.4 | 23.9 | 3.3 | 0.7 | 7.2 | 100 |
| 26* | C | 50 | 48.8 | 19.4 | 25.2 | 3.5 | 1.6 | 7.2 | 100 |
| 27 | C | 0 | 55.2 | 19.8 | 20.2 | 4.1 | 0.2 | 4.9 | 85 |
| 28 | C | 70 | 51.1 | 19.8 | 23.8 | 3.7 | 0.8 | 6.4 | 75 |
| 29 | C | 0 | 52.1 | 19.8 | 23.8 | 3.6 | 0.2 | 6.6 | 85 |
| 30 | B | 58 | 51.9 | 20.3 | 22.5 | 3.3 | 1.6 | 6.8 | 70 |
| 31* | B | 0 | 51.6 | 20.3 | 23.6 | 2.9 | 0.2 | 8.1 | 100 |
| 32 | C | 80 | 48.5 | 20.3 | 23.7 | 4.2 | 2.0 | 5.6 | 85 |
| 33 | B | 0 | 53.4 | 20.4 | 20.9 | 4.2 | 0.2 | 5.0 | 95 |
| 34* | B | 0 | 49.8 | 21.4 | 24.6 | 3.7 | 0.2 | 6.6 | 100 |
| 35 | B | 60 | 51.0 | 21.7 | 22.1 | 3.7 | 1.0 | 6.0 | 100 |
| 36 | C | 85 | 50.5 | 22.5 | 21.9 | 3.1 | 1.5 | 7.1 | 95 |
| 37* | C | 90 | 48.5 | 23.6 | 20.4 | 4.6 | 2.3 | 4.4 | 40 |
| 38* | B | 100 | 49.2 | 24.5 | 18.3 | 5.3 | 2.2 | 3.5 | 20 |
| 39* | C | 90 | 43.6 | 24.7 | 23.7 | 5.6 | 1.6 | 4.2 | 60 |
| 40 | B | 0 | 47.1 | 27.5 | 21.5 | 3.4 | 0.2 | 6.3 | 100 |
| 41* | C | 27 | 50.6 | 28.6 | 17.3 | 2.1 | 0.9 | 8.2 | 90 |
| 42* | B | 80 | 42.1 | 29.4 | 22.3 | 3.6 | 1.7 | 6.2 | 20 |
| 43* | B | 76 | 38.7 | 33.5 | 22.9 | 3.3 | 1.6 | 6.9 | 30 |
| 44* | B | 70 | 36.2 | 37.0 | 22.0 | 3.2 | 1.6 | 6.9 | 0 |

*Examples not according to the invention

What is claimed is:

1. A fused cast AZS product containing:
   $Al_2O_3$: 45–65 wt. %,
   $ZrO_2$: 10.0–29.0 wt. %,
   $SiO_2$: more than 20.0 to 24.0 wt. %,
   $SiO_2/(Na_2O+K_2O)$ weight ratio: 4.5–8, and
   CaO+MgO+impurities: 0.5–4.0 wt. %.

2. The fused cast AZS product according to claim 1, wherein:

7. The fused cast AZS product according to claim 6, wherein the secondary materials constitute from 40 wt. % to 70 wt. % of the starting charge.

8. The fused cast AZS product according to claim 6, in the form of blocks containing 20–25 wt. % $ZrO_2$.

9. The fused cast AZS product according to claim 6, in the form of cruciform components and containing 14–20 wt. % $ZrO_2$.

* * * * *